US010078441B2

United States Patent
Lee et al.

(10) Patent No.: US 10,078,441 B2
(45) Date of Patent: Sep. 18, 2018

(54) ELECTRONIC APPARATUS AND METHOD FOR CONTROLLING DISPLAY DISPLAYING CONTENT TO WHICH EFFECTS IS APPLIED

(71) Applicant: Samsung Electronics Co., Ltd., Gyeonggi-do (KR)

(72) Inventors: Kyung-Jun Lee, Gyeonggi-do (KR); Giang-Yoon Kwon, Seoul (KR); Ki-Hyoung Son, Gyeonggi-do (KR); Hye-Jung Chang, Seoul (KR); Hyun-Yeul Lee, Seoul (KR); Seung-Yeon Chung, Seoul (KR)

(73) Assignee: Samsung Electronics Co., Ltd (KR)

( * ) Notice: Subject to any disclaimer, the term of this patent is extended or adjusted under 35 U.S.C. 154(b) by 28 days.

(21) Appl. No.: 15/222,342

(22) Filed: Jul. 28, 2016

(65) Prior Publication Data

US 2017/0031559 A1  Feb. 2, 2017

(30) Foreign Application Priority Data

Jul. 28, 2015  (KR) .................. 10-2015-0106527

(51) Int. Cl.
| | | |
|---|---|---|
| *G06F 3/0488* | (2013.01) | |
| *G06F 3/0481* | (2013.01) | |
| *G06T 11/60* | (2006.01) | |
| *G06F 3/14* | (2006.01) | |

(52) U.S. Cl.
CPC ........ *G06F 3/0488* (2013.01); *G06F 3/04817* (2013.01); *G06F 3/14* (2013.01); *G06T 11/60* (2013.01)

(58) Field of Classification Search
CPC ...... G06F 3/0488; G06F 3/04817; G06F 3/14; G06T 11/60
See application file for complete search history.

(56) References Cited

U.S. PATENT DOCUMENTS

| | | | |
|---|---|---|---|
| 2014/0192229 A1* | 7/2014 | Kim .................. | G06K 9/00302 348/231.3 |
| 2015/0104150 A1 | 4/2015 | Takehara et al. | |
| 2015/0268780 A1* | 9/2015 | Kim ...................... | G06F 3/0412 345/174 |

FOREIGN PATENT DOCUMENTS

| | | |
|---|---|---|
| KR | 101305547 | 9/2013 |
| KR | 1020140089454 | 7/2014 |

* cited by examiner

*Primary Examiner* — Lisa Landis
(74) *Attorney, Agent, or Firm* — The Farrell Law Firm, P.C.

(57) ABSTRACT

An electronic apparatus and a method for controlling a display that displays content is provided. The method includes displaying content, detecting an input corresponding to the displayed content, determining an emotional level based on the detected input, and applying an emotional effect corresponding to the determined emotional level to the displayed content, and displaying the emotional effect on the displayed content.

20 Claims, 10 Drawing Sheets

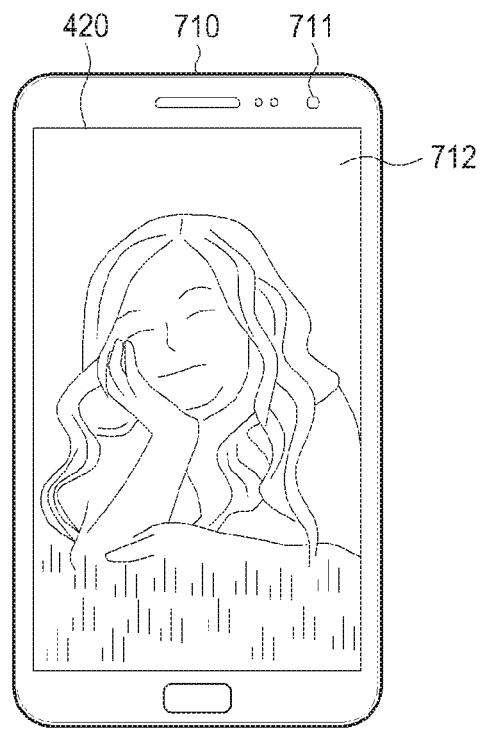
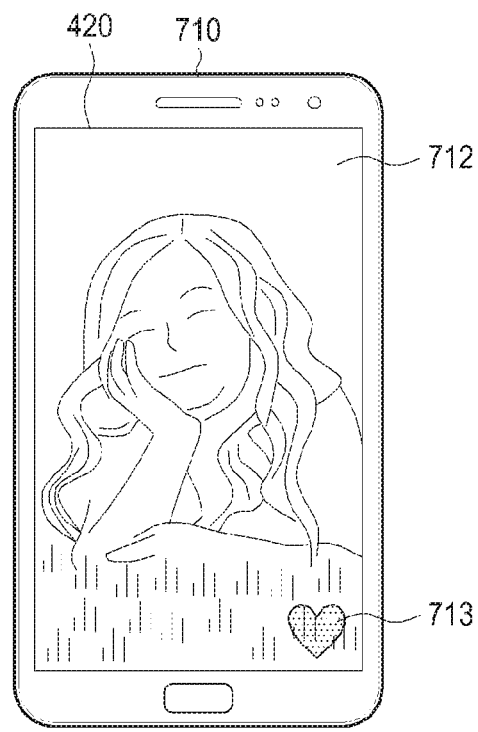
FIG.7A  FIG.7B
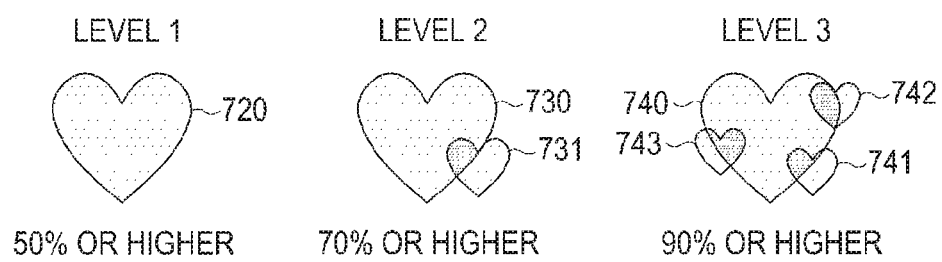
FIG.7C

ELECTRONIC APPARATUS AND METHOD FOR CONTROLLING DISPLAY DISPLAYING CONTENT TO WHICH EFFECTS IS APPLIED

PRIORITY

This application claims priority under 35 U.S.C. § 119(a) to Korean Patent Application Serial No. 10-2015-0106527, which was filed in the Korean Intellectual Property Office on Jul. 28, 2015, the entire content of which is incorporated herein by reference.

BACKGROUND

1. Field of the Disclosure

The present disclosure generally relates to an electronic apparatus, and in particular, to an electronic apparatus and a method for controlling a display that displays content.

2. Background of the Related Art

Various services and additional functions provided by electronic apparatuses have been expanded. In order to increase the value of electronic apparatuses and meet the needs of users, various applications executable by the electronic apparatuses have been developed.

Accordingly, applications and programs capable of reproducing or displaying various pieces of content may be stored in an electronic apparatus, that is mobile and includes a screen having a touch function, such as a smart phone, a mobile phone, a laptop personal computer (PC), and a tablet PC. While viewing content desired by a user on the electronic apparatus, the user can not only feel various emotions, but can also transmit content to the other party through the electronic apparatus.

Conventionally, when a user desires to share the feeling of content with another person, the content and text expressing the user's feeling are separately transmitted.

Specifically, when an emotion for content is transmitted, the content is transmitted and then, text or an icon expressing the emotion is transmitted, or the text or icon expressing the emotion is transmitted and then, the content is transmitted. The content and the text or icon expressing the emotion are separately transmitted as described above, causing inconvenience to the user in that the user needs to retransmit information on the emotion as text or an icon whenever the user feels the emotion for the relevant content.

Accordingly, there is a need in which an effect according to an emotion of the user, who is viewing content, is applied to the content and the effect, according to the emotion of the user, which is applied to the content, is transmitted, and thereby, another user who receives the content can understand the emotion of the user who has transmitted the content.

SUMMARY

Therefore, aspects of the present disclosure provide an electronic apparatus and a method for controlling a display that displays content.

In accordance with an aspect of the present disclosure, a method for controlling a display by an electronic apparatus is provided. The method includes displaying content, detecting an input corresponding to the displayed content, determining an emotional level based on the detected input, and applying an emotional effect corresponding to the determined emotional level to the displayed content, and displaying the emotional effect, which is applied to the displayed content, on the displayed content.

In accordance with another aspect of the present disclosure, an electronic apparatus for controlling a display is provided. The electronic apparatus includes a display that displays content, and a control unit that detects an input corresponding to the displayed content, determines an emotional level based on the detected input, and applies an emotional effect corresponding to the determined emotional level to the displayed content, wherein the display displays the applied content.

According to an aspect of the present disclosure, in a state where a user is viewing content, an emotion of the user may be applied to the content and the emotion of the user which is applied to the content may be transmitted to another user, and thereby, another user can understand the emotion of the user, who has transmitted the content, through the received content.

According to an aspect of the present disclosure, an emotion of the user may be expressed as a level through a change in recognition of the user's face, the number of times of an input, and the like, and an emotional effect according to the emotion of the user which is expressed as the level may be applied to the content, and thereby, a content emotion effect may be visually distinguished from each other. Further, an emotional effect and content may be combined, and content to which an emotional effect is applied may be stored and thereby, the emotional effect applied to the content may be subsequently confirmed.

BRIEF DESCRIPTION OF THE DRAWINGS

The above and other aspects, features, and advantages of the present disclosure will be more apparent from the following detailed description taken in conjunction with the accompanying drawings, in which:

FIG. 7A is a view illustrating an example of displaying content according to various embodiments of the present disclosure;

FIG. 7B is a view illustrating an example of displaying an emotional effect together with content in response to the recognition of a user's face in a state of displaying the content according to various embodiments of the present disclosure;

FIG. 7C is a view illustrating an example of displaying an emotional level of a user in response to the recognition of the user's face according to various embodiments of the present disclosure;

DETAILED DESCRIPTION

Figure 1:
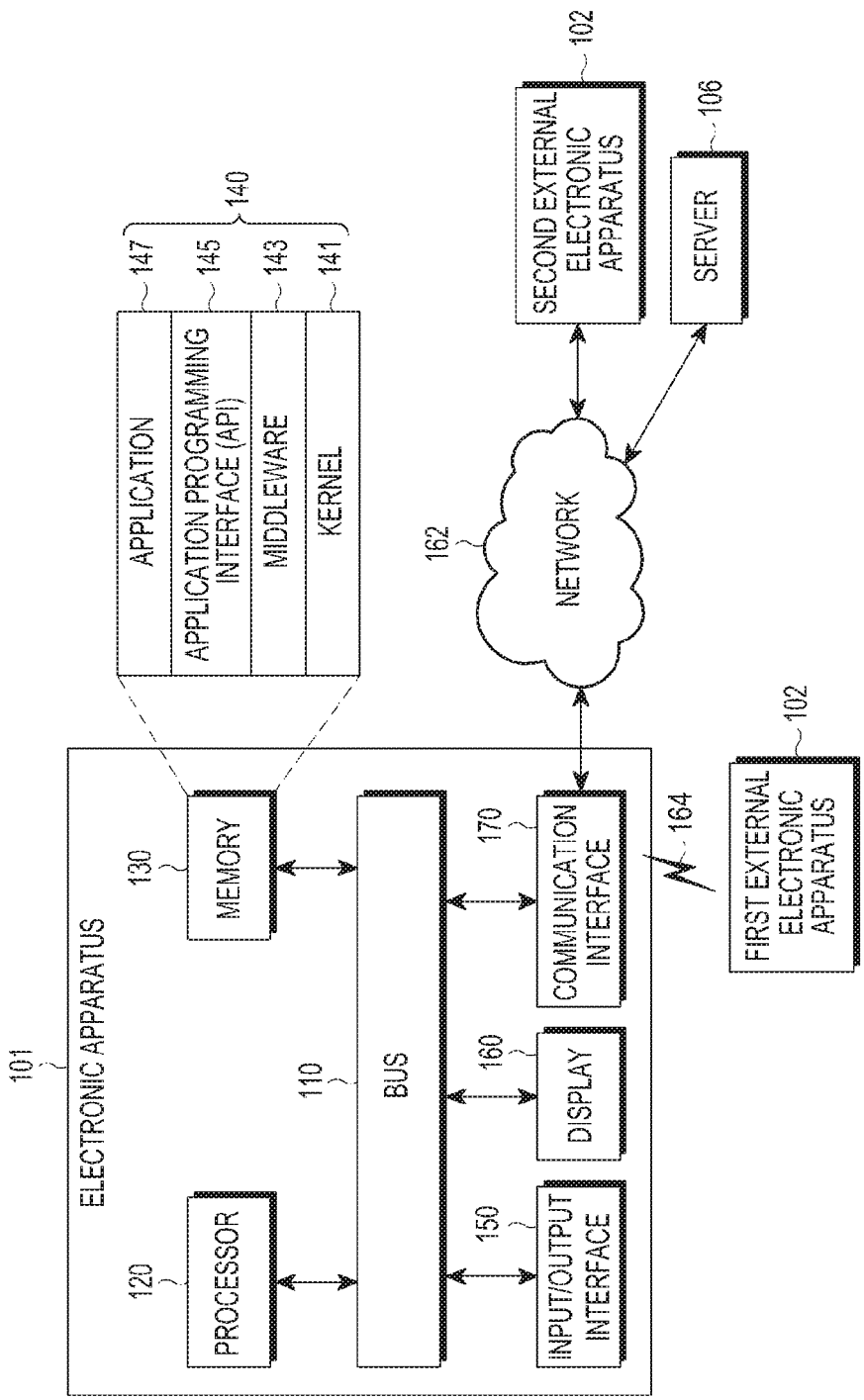
FIG. 1 illustrates an electronic apparatus in a network environment according to various embodiments of the present disclosure.

Hereinafter, various embodiments of the present disclosure will be described with reference to the accompanying drawings. However, it should be understood that there is no limiting the present disclosure to the particular forms disclosed herein, rather, the present disclosure should be construed to cover various modifications, equivalents, and/or alternatives of embodiments of the present disclosure. In the description of the drawings, similar reference numerals may be used to designate similar elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B.

The expressions "a first", "a second", "the first", or "the second" used in various embodiments of the present disclosure may modify various components regardless of the order and/or the importance but do not limit the corresponding components. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a general-purpose processor (e.g., central processing unit (CPU) or application processor (AP)) that can perform the corresponding operations by executing one or more software programs stored in a memory device.

The terms used herein are for the purpose of describing particular embodiments and do not limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even terms defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, eyeglasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

An electronic device according to various embodiments of the present disclosure may be a home appliance. The smart home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung Home-Sync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic device for a ship (e.g., a navigation device for a ship, and a gyro-compass), avionics, security devices, an automotive head unit, a robot for home or industry, an automatic teller machine (ATM), point of sales (POS) terminal, or Internet of Things (IOT) device (e.g., a light bulb, various sensors, electric or gas meter, a sprinkler device, a fire alarm, a thermostat, a streetlamp, a toaster, a sporting good, a hot water tank, a heater, a boiler, etc.).

According to an embodiment of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. The electronic device may also be a flexible device. Further, the electronic device is not limited to the aforementioned devices, and may include a new electronic device according to the development of new technology.

Hereinafter, an electronic device according to various embodiments of the present disclosure will be described with reference to the accompanying drawings. In the present disclosure, the term "user" may indicate a person using an electronic device or a device (e.g., an artificial intelligence electronic device) using an electronic device.

FIG. 1 illustrates an electronic apparatus 101 in a network environment 100 according to various embodiments of the present disclosure.

Referring to FIG. 1, the electronic apparatus 101 includes a bus 110, a processor 120, a memory 130, an input/output interface 150, a display 160, and a communication interface 170. In some embodiments of the present disclosure, at least one of the above elements of the electronic apparatus 101 may be omitted from the electronic apparatus 101, or the electronic apparatus 101 may additionally include other elements.

The bus 110 may include, for example, a circuit that interconnects the elements 110 to 170 and delivers a communication (e.g., a control message and/or data) between the elements 110 to 170.

The processor 120 may include one or more of a central processing unit (CPU), an application processor (AP), and a communication processor (CP). The processor 120 may perform, for example, calculations or data processing related to control and/or communication by at least one of the other elements of the electronic apparatus 101.

The memory 130 may include a volatile memory and/or a non-volatile memory. The memory 130 may store, for example, commands or data related to at least one of the other elements of the electronic apparatus 101. According to an embodiment of the present disclosure, the memory 130 may store software and/or a program 140. The program 140 includes, for example, a kernel 141, middleware 143, an application programming interface (API) 145, and/or an application program (or an application) 147. At least some of the kernel 141, the middleware 143, and the API 145 may be referred to as an operating system (OS).

For example, the kernel 141 may control or manage system resources (e.g., the bus 110, the processor 120, the memory 130, and the like) used to execute operations or functions implemented by the other programs (e.g., the middleware 143, the API 145, and the application program 147). Also, the kernel 141 may provide an interface capable of controlling or managing the system resources by accessing the individual elements of the electronic apparatus 101 by using the middleware 143, the API 145, or the application program 147.

For example, the middleware 143 may serve as an intermediary that enables the API 145 or the application program 147 to communicate with the kernel 141 and to exchange data therewith.

Also, the middleware 143 may process one or more task requests received from the application program 147 according to a priority. For example, the middleware 143 may assign a priority, which enables the use of system resources (e.g., the bus 110, the processor 120, the memory 130, etc.) of the electronic apparatus 101, to at least one of the application programs 147. For example, the middleware 143 may perform scheduling, load balancing, and the like, of the one or more task requests by processing the one or more task requests according to the priority assigned to the at least one of the application programs 147.

The API 145 is, for example, an interface through which the application 147 controls a function provided by the kernel 141 or the middleware 143, and may include, for example, at least one interface or function (e.g., command) for file control, window control, image processing, character control, and the like.

For example, the input/output interface 150 may serve as an interface capable of delivering a command or data, which is input from a user or another external device, to the element(s) other than the input/output interface 150 within the electronic apparatus 101. Also, the input/output interface 150 may output, to the user or another external device, commands or data received from the element(s) other than the input/output interface 150 within the electronic apparatus 101.

Examples of the display 160 may include a liquid crystal display (LCD), a light-emitting diode (LED) display, an Organic Light-Emitting Diode (OLED) display, a microelectromechanical systems (MEMS) display, and an electronic paper display. For example, the display 160 may display various pieces of content (e.g., text, images, videos, icons, symbols, etc.) to the user. The display 160 may include a touch screen, and may receive, for example, a touch input, a gesture input, a proximity input, or a hovering input provided by an electronic pen or a body part of the user.

The communication interface 170 may establish, for example, communication between the electronic apparatus 101 and an external apparatus (e.g., a first external electronic apparatus 102, a second external electronic apparatus 104, or a server 106). For example, the communication interface 170 may be connected to a network 162 through wireless or wired communication and may communicate with the external apparatus (e.g., the second external electronic apparatus 104 or the server 106).

The wireless communication may be performed by using at least one of, for example, long-term evolution (LTE), LTE-advanced (LTE-A), code division multiple access (CDMA), wideband CDMA (WCDMA), universal mobile telecommunications system (UMTS), WiBro (Wireless Broadband), and global system for mobile communications (GSM), as a cellular communication protocol. Also, examples of the wireless communication may include short-range communication 164. The short-range communication 164 may be performed by using at least one of, for example, Wi-Fi, Bluetooth, near field communication (NFC), and global navigation satellite system (GNSS). The GNSS may include at least one of, for example, a global positioning system (GPS), a global navigation satellite system (Glonass), a Beidou navigation satellite system (hereinafter "Beidou"), and a European global satellite-based navigation system (Galileo), according to a use area, a bandwidth, and the like. Hereinafter, in the present disclosure, the term "GPS" may be interchangeably used with the term "GNSS." The wired communication may be performed by using at least one of, for example, a universal serial bus (USB), a high definition multimedia interface (HDMI), recommended standard 232 (RS-232), and a plain old telephone service (POTS). The network 162 may include at least one of communication networks, such as a computer network (e.g., a local area network (LAN), or a wide area network (WAN)), the Internet, and a telephone network.

Each of the first and second external electronic apparatuses 102 and 104 may be of a type identical to, or different from, that of the electronic apparatus 101. According to an embodiment of the present disclosure, the server 106 may include a group of one or more servers. All or some of operations performed by the electronic apparatus 101 may be performed by another electronic apparatus or multiple electronic apparatuses 102 and 104 or the server 106. When the electronic apparatus 101 needs to perform some functions or services automatically or by a request, the electronic apparatus 101 may send, to the first external electronic apparatus 102, the second external electronic apparatus 104, or the server 106, a request for performing at least some functions related to the functions or services, instead of performing the functions or services by itself, or additionally. Another electronic apparatus 102, the second external electronic apparatus 104, or the server 106 may execute the requested functions or the additional functions, and may deliver a result of the execution to the electronic apparatus 101. The electronic apparatus 101 may process the received result without any change or additionally and may provide the requested functions or services. To this end, use may be made of, for example, cloud computing technology, distributed computing technology, or client-server computing technology.

Figure 2:
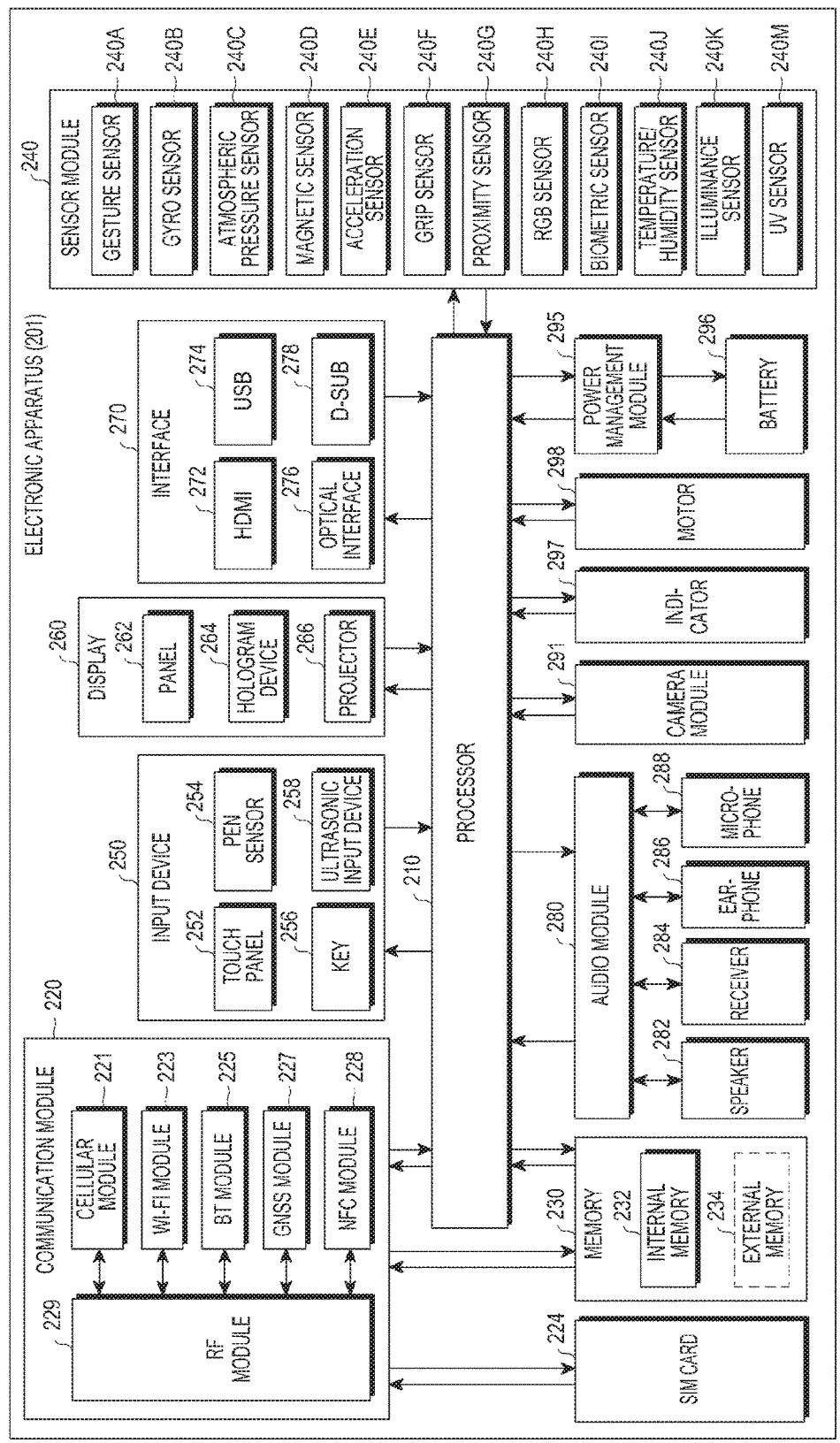
FIG. 2 is a block diagram illustrating a configuration of an electronic apparatus according to various embodiments of the present disclosure.

FIG. 2 is a block diagram illustrating a configuration of an electronic apparatus 201 according to various embodiments of the present disclosure.

For example, the electronic apparatus 201 may include the whole or part of the electronic apparatus 101 illustrated in FIG. 1. The electronic apparatus 201 includes at least one processor (e.g., an AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware or software elements connected to the processor 210 by running, for example, an operation system (OS) or an application program, and may perform the processing of and arithmetic operations on various data. The processor 210 may be implemented by, for example, a system on chip (SoC). According to an embodiment of the present disclosure, the processor 210 may further include a graphical processing unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration identical or similar to that of the communication interface 170 illustrated in FIG. 1. The communication module 220 may include, for example, the cellular module 221, a Wi-Fi module 223, a Bluetooth (BT) module 225, a GNSS module 227 (e.g., a GPS module, a Glonass module, a Beidou module, or a Galileo module), an NFC module 228, and a radio frequency (RF) module 229.

For example, the cellular module 221 may provide a voice call, an image call, a text message service, an Internet service, and the like, through a communication network. According to an embodiment of the present disclosure, the cellular module 221 may identify or authenticate an electronic apparatus 201 in the communication network by using the subscriber identification module (SIM) card 224. The cellular module 221 may perform at least some of the functions that the processor 210 may provide. The cellular module 221 may include a CP.

Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one integrated chip (IC) or IC package.

The RF module 229 may transmit and receive, for example, communication signals (e.g., RF signals). The RF module 229 may include, for example, a transceiver, a power amplifier module (PAM), a frequency filter, a low noise amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The subscriber identification module 224 may include, for example, a card including an embedded SIM, and may contain unique identification information (e.g., an integrated circuit card identifier (ICCID)) or subscriber information (e.g., an international mobile subscriber identity (IMSI)).

The memory 230 (e.g., the memory 130) includes, for example, an internal memory 232 or an external memory 234. The internal memory 232 may include at least one of, for example, a volatile memory (e.g., a dynamic random access memory (DRAM), a static RAM (SRAM), a synchronous DRAM (SDRAM), etc.); a non-volatile memory (e.g., a one time programmable read-only memory (OT-PROM), a programmable ROM (PROM), an erasable and programmable ROM (EPROM), an electrically erasable and programmable ROM (EEPROM), a mask ROM, a flash ROM, a flash memory (e.g., a not AND (NAND) flash memory, a not OR (NOR) flash memory, etc.); a hard drive; and a solid state drive (SSD).

The external memory 234 may further include a flash drive, for example, a compact flash (CF), a secure digital (SD), a micro-secure digital (Micro-SD), a mini-secure digital (Mini-SD), an extreme digital (xD), a multi-media card (MMC), a memory stick, and the like. The external memory 234 may be functionally and/or physically connected to the electronic apparatus 201 through various interfaces.

For example, the sensor module 240 may measure a physical quantity or may detect an operation state of the electronic apparatus 201, and may convert the measured physical quantity or the detected operation state into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red Green Blue (RGB) sensor), a biometric sensor 240I, a temperature/humidity sensor 240J, an illuminance sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 includes, for example, a touch panel 252, a (digital) pen sensor 254, a key 256, and an ultrasonic input unit 258. The touch panel 252 may use at least one of, for example, a capacitive scheme, a resistive scheme, an infrared scheme, and an acoustic wave scheme. Also, the touch panel 252 may further include a control circuit. The touch panel 252 may further include a tactile layer and may provide a tactile response to the user.

The (digital) pen sensor 254 may include, for example, a recognition sheet which is a part of the touch panel or is separated from the touch panel. The key 256 may be, for example, a physical button, an optical key, and a keypad. The ultrasonic input unit 258 may sense an ultrasonic wave generated by an input means through a microphone 288, and may confirm data corresponding to the sensed ultrasonic wave.

The display 260 (e.g., the display 160) may include a panel 262, a hologram unit 264, and a projector 266. The panel 262 may include a configuration identical, or similar to that of the display 160 illustrated in FIG. 1. The panel 262 may be implemented to be, for example, flexible, transparent, or wearable. The panel 262 and the touch panel 252 may be implemented as one module. The hologram unit 264 may display a three-dimensional image in the air by using the interference of light. The projector 266 may display an image by projecting light onto a screen. The screen may be located, for example, inside or outside the electronic apparatus 201. According to an embodiment of the present disclosure, the display 260 may further include a control circuit for controlling the panel 262, the hologram unit 264, or the projector 266.

The interface 270 includes, for example, a high-definition multimedia interface (HDMI) 272, a universal serial bus (USB) 274, an optical interface 276, and a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media Card (MMC) interface, or an infrared data association (IrDA) standard interface.

For example, the audio module 280 may bidirectionally convert between a sound and an electrical signal. At least some elements of the audio module 280 may be included in, for example, the input/output interface 150 illustrated in FIG. 1. The audio module 280 may process sound information which is input or output through, for example, a speaker 282, a receiver 284, an earphone 286, the microphone 288, and the like.

The camera module 291 is, for example, a device capable of capturing a still image and a moving image. According to an embodiment of the present disclosure, the camera module 291 may include one or more image sensors (e.g., a front sensor or a back sensor), a lens, an image signal processor (ISP), and a flash (e.g., an LED, a xenon lamp, and the like).

The power management module 295 may manage, for example, power of the electronic apparatus 201. The electronic apparatus 201 may be an electronic apparatus supplied with power from a battery, but is not limited thereto. According to an embodiment of the present disclosure, the power management module 295 may include a power management integrated circuit (PMIC), a charger IC, or a battery gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual charge quantity of the battery 296, and a voltage, a current, or a temperature during the charging. Examples of the battery 296 may include a rechargeable battery and a solar battery.

The indicator 297 may display a particular state (e.g., a booting state, a message state, a charging state, and the like) of the electronic apparatus 201 or a part (e.g., the processor 210) of the electronic apparatus 201. The motor 298 may convert an electrical signal into mechanical vibration, and may generate vibration, a haptic effect, and the like. The electronic apparatus 201 may include a processing unit (e.g., a GPU) for supporting a mobile television (TV). The processing unit for supporting a mobile TV may process media data according to a standard, such as, for example, (digital) multimedia broadcasting (DMB), digital video broadcasting DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components may be combined into one entity, which may perform functions identical to those of the relevant components before the combination.

Figure 3:
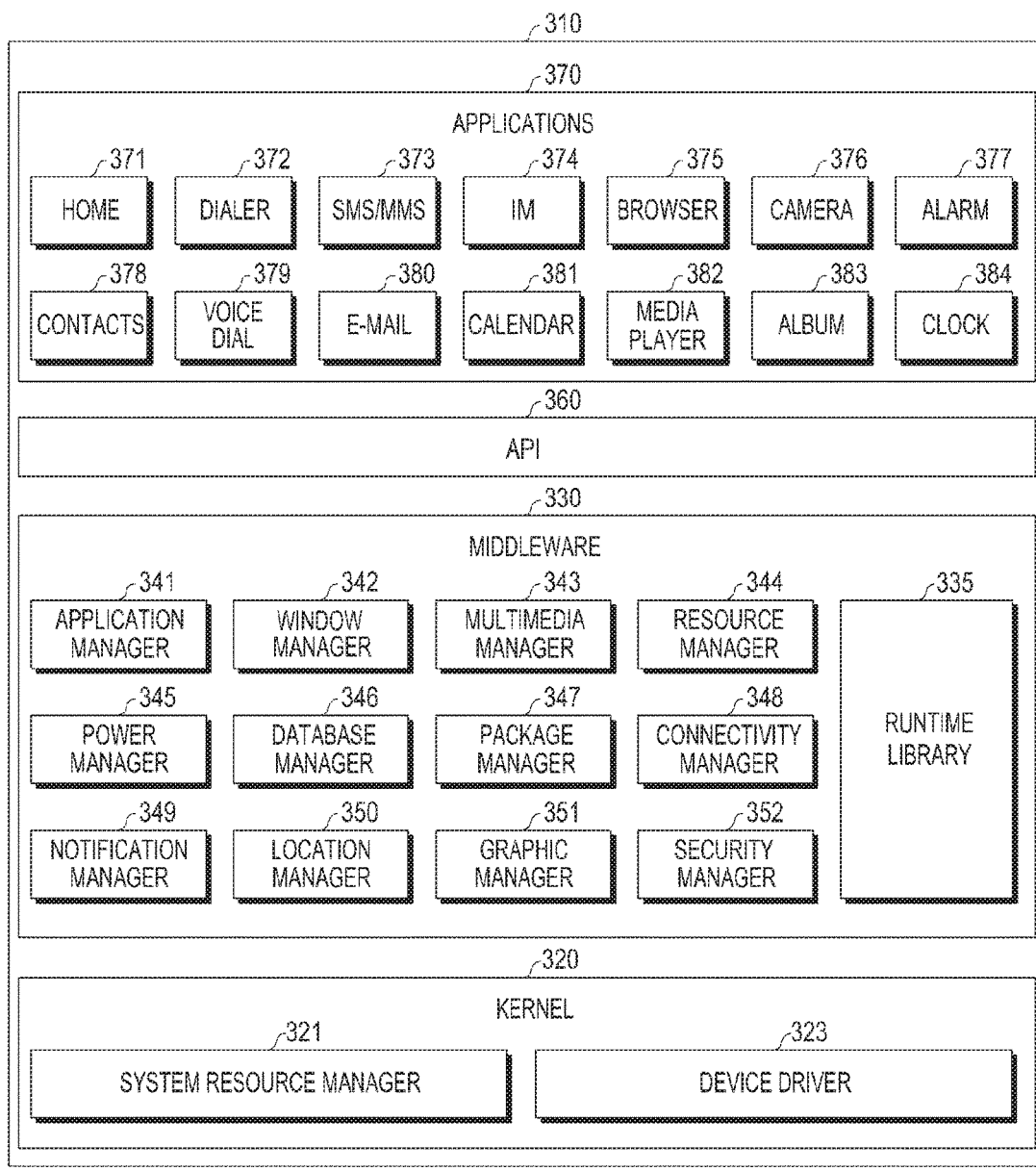
FIG. 3 is a block diagram illustrating a configuration of a program module according to various embodiments of the present disclosure.

FIG. 3 is a block diagram illustrating a configuration of a program module according to various embodiments of the present disclosure.

According to an embodiment of the present disclosure, the program module 310 (e.g., the program 140) may include an OS for controlling resources related to the electronic apparatus (e.g., the electronic apparatus 101) and/or various applications (e.g., the application programs 147) executed in the OS. The OS may be, for example, Android, iOS, Windows, Symbian, Tizen, Samsung Bada OS, and the like.

The program module 310 includes a kernel 320, middleware 330, an API 360, and/or an application 370. At least some of the program module 310 may be preloaded on the electronic apparatus, or may be downloaded from an external electronic apparatus 102 or 104, or the server 106.

The kernel 320 (e.g., the kernel 141) may include, for example, a system resource manager 321 and/or a device driver 323. The system resource manager 321 may perform the control, allocation, retrieval, and the like, of system resources. According to an embodiment of the present disclosure, the system resource manager 321 may include a process manager, a memory manager, a file system manager, and the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

For example, the middleware 330 may provide a function required in common by the applications 370, or may provide various functions to the applications 370 through the API 360 so as to enable the applications 370 to efficiently use the limited system resources within the electronic apparatus. According to an embodiment of the present disclosure, the middleware 330 (e.g., the middleware 143) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a complier uses to add a new function by using a programming language during the execution of the application 370. The runtime library 335 may perform input/output management, memory management, the functionality for an arithmetic function, and the like.

The application manager 341 may manage, for example, the life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the relevant format. The resource manager 344 may manage resources, such as a source code, a memory, a storage space, and the like, of at least one of the applications 370.

For example, the power manager 345 may operate together with a basic input/output system (BIOS), etc. and may manage a battery or power, and may provide power information and the like, required for an operation of the electronic apparatus. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic apparatus 101 has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) include one or more applications capable of performing functions, such as, for example, a home 371, a dialer 372, an SMS/MMS 373, an instant message (IM) 374, a browser 375, a camera 376, an alarm 377, a contact 378, a voice dialer 379, an email 380, a calendar 381, a media player 382, an album 383, a clock 384, health care (e.g., which measures an exercise quantity, a blood sugar level, and the like), and providing of environmental information (e.g., information on atmospheric pressure, humidity, temperature, and the like).

According to an embodiment of the present disclosure, the applications 370 may include an information exchange application supporting information exchange between the electronic apparatus 101 and an external electronic apparatus 102 or 104. Examples of the information exchange application may include a notification relay application for delivering particular information to an external electronic apparatus and a device management application for managing an external electronic apparatus.

For example, the notification relay application may include a function of delivering, to the external electronic apparatus 102 or 104, notification information generated by other applications (e.g., an SMS/MMS application, an email application, a health care application, an environmental information application, etc.) of the electronic apparatus 101. Also, for example, the notification relay application may receive notification information from the external electronic apparatus and may provide the received notification information to the user.

The device management application may manage (e.g., install, delete, or update), for example, at least one function (e.g., turning on/off the external electronic apparatus itself (or some component parts thereof) or adjusting the brightness (or resolution) of the display) of the external electronic apparatus 102 or 104, communicating with the electronic apparatus, an application executed in the external electronic apparatus, or a service (e.g., a telephone call service, a message service, and the like) provided by the electronic apparatus.

According to an embodiment of the present disclosure, the application 370 may include an application (e.g., a health care application of a mobile medical device and the like) designated according to an attribute of the external electronic apparatus 102 or 104. The application 370 may include an application received from the external electronic apparatus 102, 104 or the server 106. The application 370 may include a preloaded application or a third party application which can be downloaded from the server 106. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Figure 4:
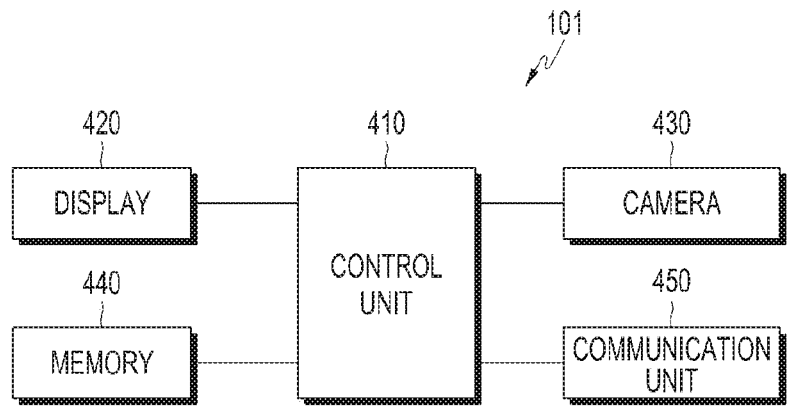
FIG. 4 is a block diagram illustrating a configuration of an electronic apparatus displaying an emotional effect on displayed content according to various embodiments of the present disclosure.

FIG. 4 is a block diagram illustrating a configuration of an electronic apparatus displaying an emotional effect on displayed content according to various embodiments of the present disclosure.

According to an embodiment of the present disclosure, the electronic apparatus 101 includes a display 420, a camera 430, a memory 440, a communication unit 450, and a control unit 410.

The display 420 may perform at least one function or operation performed by the display 160 illustrated in FIG. 1. The display 420 may display various pieces of content (e.g., text, images, videos, icons, symbols, etc.). The display 420 may apply an emotional effect (e.g., an emoticon, an icon, a heart, etc.) expressing an emotion of the user to various pieces of content, and may display the emotional effect expressing the emotion of the user which is applied to the various pieces of content. The display 420 may include a touch screen, and may receive a touch input, a gesture input, a proximity input, or a hovering input made by, for example, an electronic pen or a part of the user's body. The display 420 may display an emotional effect, which has been generated by the control unit 410, on the displayed content. Examples of the emotional effect may include an emoticon, an icon, a character, and the like, capable of expressing an emotion of the user who is viewing the displayed content. Also, the emotional effect according to an embodiment of the present disclosure expresses the emotion of the user who has viewed the content, and may include various pieces of information which enable another person to infer the emotion of the user, who has viewed the content, through the emotional effect.

The camera 430 may perform at least one function or operation performed by the camera module 291 illustrated in FIG. 2. The camera 430 is, for example, a device capable of capturing a still image and a moving image. According to an embodiment of the present disclosure, the camera 430 may include one or more image sensors (e.g., a front sensor or a back sensor), a lens, an image signal processor (ISP), and a flash (e.g., an LED, a xenon lamp, and the like). When content is displayed by the display 420, the camera 430 may be automatically activated, or may be selectively (e.g., by a selection made by the user) activated. When the content is displayed by the display 420, the camera 430 may track the gaze of the user's eyes and may determine a part or a point on the displayed content that the user is currently viewing.

The memory 440 may perform at least one function or operation performed by the memory 130 illustrated in FIG. 1. The memory 440 may store, for example, a command or data related to at least one of the other elements of the electronic apparatus 101. According to an embodiment of the present disclosure, the memory 130 may store software and/or a program 140. The memory 440 may store, for example, an application or a program capable of tracking the gaze of the user's eyes. Also, the memory 440 may store an application or a program capable of adding an emotional effect of the user onto the displayed content. The memory 440 may store, for example, various icons, emoticons, and characters capable of expressing an emotional effect of the user, and may store various pieces of content, such as photographs, moving images, and the like, to which the emotional effect may be applied.

The communication unit 450 may perform at least one function or operation performed by the communication module 170 illustrated in FIG. 1. The communication unit 450 may establish communication between, for example, the electronic apparatus 101 and an external apparatus 102, 104, or the server 106. For example, the communication unit 450 may be connected to the network 162 through wireless or wired communication and may transmit/receive content to/from the external apparatus 102, 104 or the server 106, and may also transmit/receive content including an emotional effect.

The control unit 410 may perform at least one function or operation performed by the processor 120 illustrated in FIG. 1. The control unit 410 may include one or more of, for example, a CPU, an AP, and a CP. The control unit 410 may perform, for example, calculations or data processing related to control over and/or communication by at least one of the other elements of the electronic apparatus 101.

For example, the control unit 410 may display content on the display 420, may detect an input corresponding to the displayed content, may determine an emotional level based on the detected input, may apply an emotional effect, which corresponds to the determined emotional level, to the displayed content, and may display the emotional effect, which is applied to the displayed content, on the display 420.

The control unit 410 may detect, for example, an input on the content displayed on the display 420. When the content is displayed on the display 420, the control unit 410 may activate the camera 430, and may recognize the face of the user through the activated camera 430. The input may include at least one of the recognition of the face of the user who views the displayed content, and a touch and a hovering on the displayed content. For example, the control unit 410 may activate the camera 430 and may detect positions of, and changes in, the eyes, nose, gaze of the eyes, and mouth of the user on the displayed content, and may determine whether the user currently laughs, currently weeps, is currently sad, or is currently happy. Such a determination basis is such that respective thresholds of facial expressions may be stored in the memory 440 and the control unit 410 may determine an emotion of the user through the thresholds and the currently-recognized face of the user. The control unit 410 may determine an emotion of the user based on a degree of the recognized facial expression of the user.

The control unit 410 may detect an input by at least one of a touch and a hovering on the display 420 that displays the content, and may determine a point (e.g., display position coordinates) at which the input has been detected. The control unit 410 may determine an emotion of the user through at least one of a duration and the number of times of a touch or a hovering. The control unit 410 may determine the number of times of a touch or a hovering during a predetermined time period, and may determine that an emotional level of the user becomes higher as the number of times of the touch or hovering increases. For example, when the content displayed on the display 420 is a photograph of a beautiful baby, while the user views the displayed content, the user may not only wear a satisfied look, but may also touch the displayed content. In this case, the control unit 410 may recognize the face of the user and may determine that the user is feeling pleasure. The control unit 410 may determine that an emotional level of the user is high, according to the degree of the facial expression of the user or the number of times of a touch.

When the detected input is at least one of a touch input and a hovering input, the control unit 410 may display an emotional effect at the touched point. Also, when the detected input is face recognition using the camera 430, the control unit 410 may analyze the gaze of the eyes of the user and may display an emotional effect at a position of the analyzed gaze of the eyes of the user. The control unit 410 may store, in the memory 440, an identifier of the content displayed on the display 420, the emotional level of the user, and coordinate information on coordinates (position) at which the emotional effect is displayed.

Figure 5:
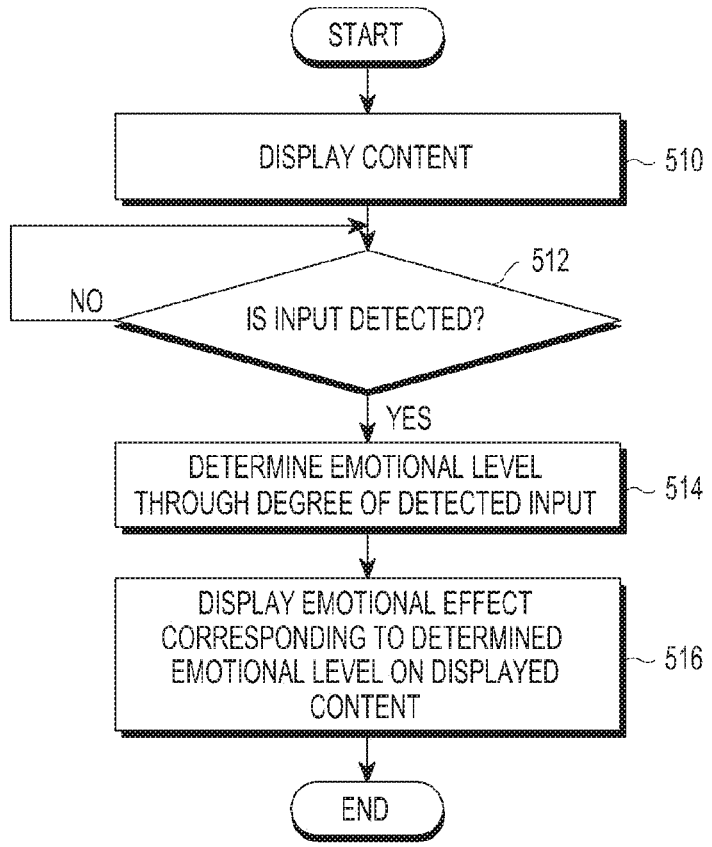
FIG. 5 is a flowchart illustrating a process for displaying an emotional effect on displayed content according to various embodiments of the present disclosure.

FIG. 5 is a flowchart illustrating a process for displaying an emotional effect on displayed content according to various embodiments of the present disclosure.

In step 510, the electronic apparatus 101 displays content on the display 420. The electronic apparatus 101 may display content, such as a photograph, a picture, and a moving image, on the display 420. When the content is displayed, the electronic apparatus 101 may activate the camera 430 and may recognize the face of the user. When a command for activating the camera 430 is received from the user in a state of displaying the content, the electronic apparatus 101 may activate the camera 430 and may recognize the face of the user. When a predetermined time period elapses after the content is displayed, the electronic apparatus 101 may activate the camera 430. The electronic apparatus 101 may determine a state of an emotion of the user, through a facial expression (e.g., eyes, nose, mouth, etc.) of the user or a change in the facial expression of the user, which is recognized through the activated camera 430. The electronic apparatus 101 may determine a state of the current facial expression of the user, through a threshold of a standard face according to an emotion which is pre-stored in the memory 440. Also, the electronic apparatus 101 may determine a current emotional degree of the user based on the recognized face of the user.

When an input is detected in step 512, in step 514, the electronic apparatus 101 determines an emotional level based on the degree of the detected input. The electronic apparatus 101 may detect an input from the user in a state of displaying the content. The input may include at least one of the recognition of the face of the user who is viewing the content, and a touch and a hovering on the displayed content. Also, the electronic apparatus 101 may detect a hovering input on the displayed content, and may determine an emotion of the user through the input by the hovering. The electronic apparatus 101 may determine an emotional level of the user based on the degree of a change in the facial expression of the user or through the number of times of a touch. For example, the electronic apparatus 101 may determine whether the facial expression of the user, which is recognized through the camera 430, is a smiling facial expression, a laughing facial expression, or an angry facial expression. Also, the electronic apparatus 101 may determine the degree of the facial expression. The electronic apparatus 101 may determine an emotion of the user based on the degree of the facial expression of the user. Further, the electronic apparatus 101 may determine an emotion of the user through at least one of a duration and the number of times of the touch or hovering. The electronic apparatus 101 may determine that an emotional level of the user becomes higher as the degree of the recognized facial expression of the user becomes higher. If the duration of the touch is greater than or equal to a threshold or when the number of times of the touch is greater than or equal to a threshold, the electronic apparatus 101 may determine that the emotional level of the user is high.

In step 516, the electronic apparatus 101 displays an emotional effect, which corresponds to the determined emotional level, on the displayed content. The electronic apparatus 101 may display the emotional effect, which corresponds to the emotional level of the user, on the displayed content, and examples of the emotional effect may include various emoticons, icons, and characters, such as a heart symbol, a lightning symbol, and the like. When the input is an input by at least one of a touch and a hovering, the electronic apparatus 101 may display the emotional effect at the touched point. When the input is the recognition of the face of the user, the electronic apparatus 101 may display the emotional effect at a point where the gaze of the eyes of the user is located. The emotional effect may move on the display 420 according to a command (e.g., a touch and drag, gaze of eyes, etc.) of the user. The electronic apparatus 101 may adjust the size of the emotional effect according to the emotional level of the user, and may display the emotional effect, which has the adjusted size, on the content. The electronic apparatus 101 may adjust the size, color, shape, and the like, of the emotional effect, according to the emotional level of the user, and may display the emotional effect, which has the adjusted size, color, shape, and the like, on the content. Then, the electronic apparatus 101 may store the content to which the emotional effect is applied. The electronic apparatus 101 may store an identifier of the displayed content, a name of the displayed content, the emotional level of the user, and coordinate information on coordinates (position) on the display 420 at which the emotional effect is displayed. Then, when the stored content is accessed, the electronic apparatus 101 may display the emotional effect together with the content on the display 420. In this case, the displayed emotional effect may be displayed in response to the emotional level.

Figure 6:
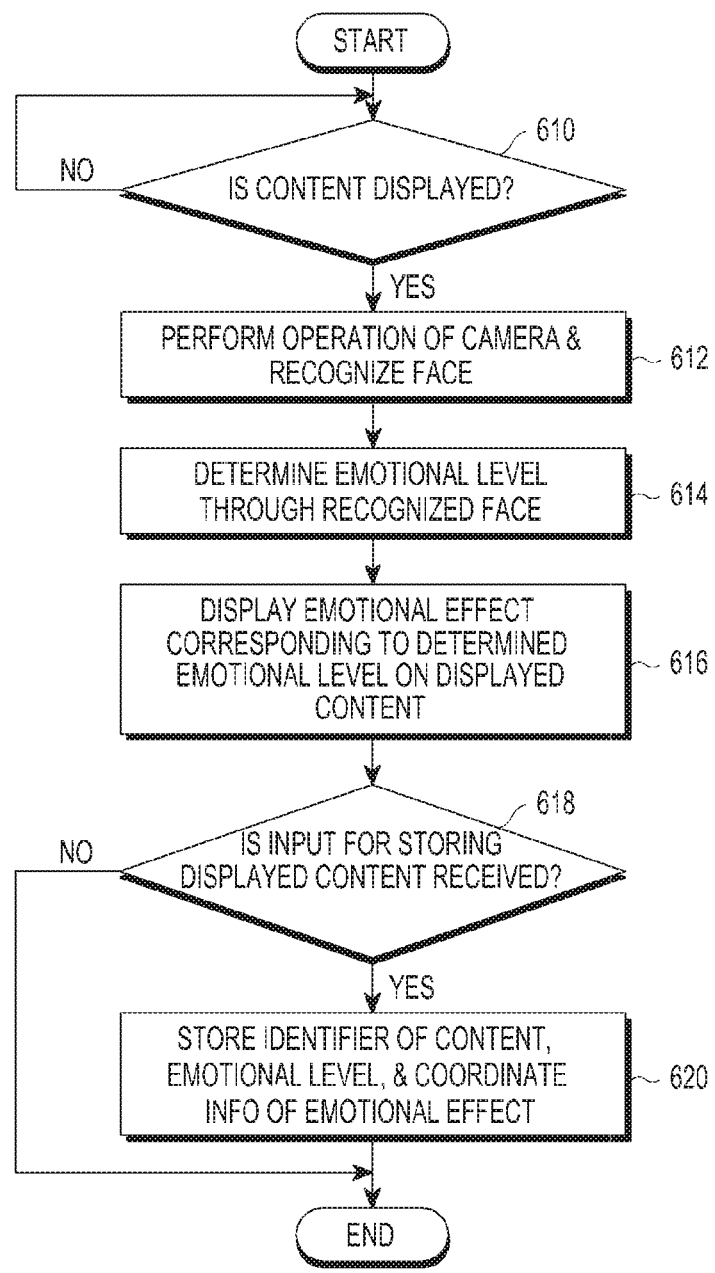
FIG. 6 is a flowchart illustrating a process for displaying an emotional effect corresponding to a recognized face on displayed content according to various embodiments of the present disclosure.

FIG. 6 is a flowchart illustrating a process for displaying an emotional effect corresponding to a recognized face on displayed content according to various embodiments of the present disclosure.

When content is displayed in step 610, in step 612, the electronic apparatus 101 performs an operation of the camera and may recognize a face. The display 420 may display various pieces of content (e.g., text, images, videos, icons, symbols, etc.). When the content is displayed, the electronic apparatus 101 may perform the operation of the camera 430. When the content is displayed, the electronic apparatus 101 may activate the camera 430 and may recognize the face of the user. When a command for activating the camera 430 is received from the user in a state of displaying the content, the electronic apparatus 101 may activate the camera 430 and may recognize the face of the user. Alternatively, when a predetermined time period elapses after the content is displayed, the electronic apparatus 101 may activate the camera 430. When the content is displayed on the display 420, the camera 430 may track the gaze of the eyes of the user and may determine a part of the displayed content that the user is currently viewing. The electronic apparatus 101 may determine a current emotional degree of the user through the recognized face of the user. The electronic apparatus 101 may determine a state of an emotion of the user, through a facial expression (e.g., eyes, nose, mouth, etc.) of the user or a change in the facial expression of the user which is recognized through the activated camera 430.

The electronic apparatus 101 may determine a state of the current facial expression of the user, through a threshold of a standard face according to an emotion which is pre-stored in the memory 440.

In step 614, the electronic apparatus 101 determines an emotional level through the recognized face. The electronic apparatus 101 may detect an input from the user in a state of displaying the content. The input may include the recognition of the face of the user who is viewing the content. The electronic apparatus 101 may determine an emotion and the emotional level of the user based on the degree of a facial expression of the user or the degree of a change in the facial expression of the user. For example, the electronic apparatus 101 may determine whether the facial expression of the user, which is recognized through the camera 430, is a smiling facial expression, a laughing facial expression, or an angry facial expression. Also, the electronic apparatus 101 may determine the degree of the facial expression. The electronic apparatus 101 may determine that the emotional level of the user becomes higher as the degree of the recognized facial expression of the user becomes higher. For example, when the content displayed on the display 420 is a photograph of a beautiful baby, the user may wear a satisfied look while viewing the displayed content. In this case, the electronic apparatus 101 may recognize the face of the user and may determine that the user is feeling pleasure. The electronic apparatus 101 may determine that the emotional level of the user is high or low, according to the degree of the facial expression of the user. The electronic apparatus 101 may analyze whether a sound detected from the user, who is viewing the content, through the microphone 288 is the sound of laughter or the sound of weeping and may determine that the user is currently laughing or weeping, and may determine the emotional level of the user through such a determination basis.

In step 616, the electronic apparatus 101 displays an emotional effect, which corresponds to the determined emotional level, on the displayed content. The electronic apparatus 101 may display the emotional effect, which corresponds to the emotional level of the user, on the displayed content, and examples of the emotional effect may include various emoticons, icons, and characters, such as a heart symbol, a lightning symbol, and the like. Also, the emotional effect according to an embodiment of the present disclosure may not only include the above-described emoticons, icons, and characters, such as a heart symbol, a lightning symbol, and the like, but may also include various pieces of information capable of expressing an emotion of the user. The electronic apparatus 101 may analyze the face or the gaze of the eyes of the user, which has been recognized in step 612, and may display the emotional effect at a point where the analyzed gaze of the eyes of the user is located. The emotional effect may move on the display 420 according to a command (e.g., a touch and drag, gaze of eyes, etc.) of the user. The electronic apparatus 101 may adjust the size of the emotional effect according to the emotional level of the user, and may display the emotional effect, which has the adjusted size, on the content. The electronic apparatus 101 may adjust the size, color, shape, and the like, of the emotional effect, according to the emotional level of the user, and may display the emotional effect, which has the adjusted size, color, shape, and the like, on the content.

When an input for storing the displayed content is received in step 618, in step 620, the electronic apparatus 101 stores an identifier of the content, the emotional level, and coordinate information of the emotional effect. Then, the electronic apparatus 101 may store the content to which the emotional effect is applied. The electronic apparatus 101 may store an identifier of the displayed content, the emotional level of the user, and coordinate information on coordinates (position) on the display 420 at which the emotional effect is displayed. Then, when the stored content is accessed, the electronic apparatus 101 may display the emotional effect together with the content on the display 420. In this case, the displayed emotional effect may be displayed in response to the emotional level.

Figure 7D:
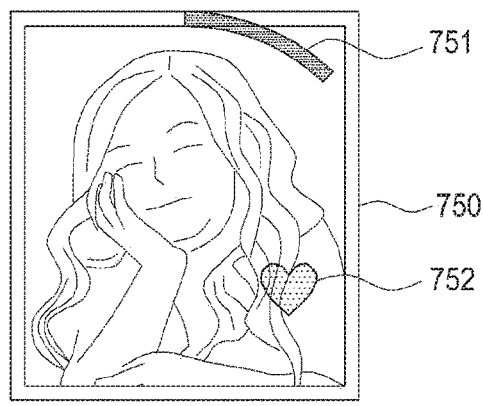
FIG. 7D is a view illustrating an example of applying an emotional level to content according to various embodiments of the present disclosure.
Figure 7E:
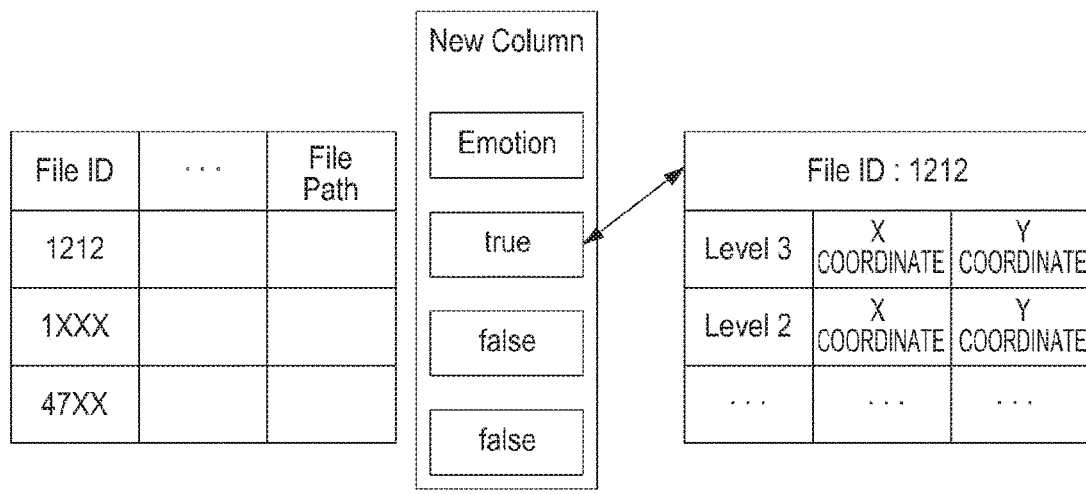
FIG. 7E is a view illustrating an example of storing content to which an emotional level is applied according to various embodiments of the present disclosure.

FIG. 7A is a view illustrating an example of displaying content according to various embodiments of the present disclosure. FIG. 7B is a view illustrating an example of displaying an emotional effect together with content in response to the recognition of a user's face in a state of displaying the. FIG. 7C is a view illustrating an example of displaying an emotional level of a user in response to the recognition of the user's face. FIG. 7D is a view illustrating an example of applying an emotional level to content. FIG. 7E is a view illustrating an example of storing content to which an emotional level is applied.

Referring to FIGS. 7A and 7B, an electronic apparatus 710 may display the content 712 on the display 420. The electronic apparatus 710 may display content, such as a photograph, a picture, and a moving image, on the display 420. When the content 712 is displayed, the electronic apparatus 710 may activate a camera 711 and may recognize the face of the user. When the user views the displayed content 712, the user may, for example, smile, may wear an expressionless look, may wear a look of kissing the air, or may wear an angry look. The electronic apparatus 710 may determine a state of an emotion of the user, through a facial expression (e.g., eyes, nose, mouth, etc.) of the user or a change in the facial expression of the user, which is recognized through the activated camera 711. The electronic apparatus 710 may determine, through the activated camera 711, whether the user is smiling, is wearing an angry look, or is wearing a look expressing a kiss. As described above, the electronic apparatus 710 may determine the current emotion of the user through the recognized face of the user, and may determine an emotional degree of the user through the facial expression of the user. When the emotional degree of the user has been determined, the electronic apparatus 710 may display an emotional effect 713 on the displayed content 712. For example, when the content 712 is a photograph of a beautiful baby and the user wears a smiling look while viewing the photograph of the beautiful baby, the electronic apparatus 710 may determine the facial expression of the user and may display the emotional effect (e.g., heart) 713 on the displayed content 712. The emotional effect 713 may be displayed at an optional position on the display 420, or may be displayed at a point where the gaze of the eyes of the user is located. Also, the emotional effect 713 may have a position adjusted according to a touch and drag of the user. Further, the emotional effect 713 may have a size and a color adjusted according to the user. Further, the heart 713 is only an example of the emotional effect, and embodiments of the present disclosure may display various emotional effects capable of expressing an emotional state of the user. The emotional effect may have a color, a size, a shape, and the like adjusted according to an emotional level of the user.

Referring to FIG. 7C, an emotional effect according to an embodiment of the present disclosure may be displayed according to an emotional level of the user. The electronic apparatus 710 may display an emotional effect, which corresponds to the emotional level of the user, on the displayed content, and examples of the emotional effect may include various emoticons, icons, and characters, such as a heart symbol, a lightning symbol, and the like. The emotional effects may be displayed according to the emotional level. For example, when a probability that the user will laugh is greater than or equal to 50%, the electronic apparatus 710 may display an emotional effect corresponding to level 1. When the probability that the user will laugh is greater than or equal to 70%, the electronic apparatus 710 may display an emotional effect corresponding to level 2. When the probability that the user will laugh is greater than or equal to 90%, the electronic apparatus 710 may display an emotional effect corresponding to level 3. The probability threshold according to each level may be adjusted. As a result of recognizing the facial expression of the user, level 1 is, for example, a case where the probability that the user will laugh is greater than or equal to 50% (between 50% to 69%) or the degree of the laughter of the user is low (e.g., in the case of smiling), and a relatively large heart 720 may be displayed. Level 2 is, for example, a case where the probability that the user will laugh is greater than or equal to 70% (between 70% to 89%) or the degree of the laughter of the user is normal (e.g., laughter showing teeth), and a relatively large heart 730 and a relatively small heart 731 may be displayed. Level 3 is, for example, a case where the probability that the user will laugh is greater than or equal to 90% or the degree of the laughter of the user is high (e.g., applause mingled with laughter and detection of the sound of laughter), and a relatively large heart 740 and multiple relatively small hearts 741, 742, and 743 may be displayed.

Referring to FIG. 7D, emotional effects 751 and 752 corresponding to an emotional level according to an embodiment of the present disclosure may be applied to content 750 and may be displayed together with the content 750. For example, when the content 750 is a photograph of a beautiful baby and the user wears a smiling look while viewing the photograph of the beautiful baby, the electronic apparatus 710 may determine the facial expression of the user, and may display an emotional effect on the displayed content 750. The emotional effect may be expressed as a heart 752, or may be expressed as a bar shape 751 displayed around the content according to the emotional level. The heart 752 or the bar shape 751 may have a size or the degree of increase in length depending on the emotional level. The emotional effects 751 and 752 may each have a color, a size, a shape, and the like, adjusted according to the emotional level or emotional degree of the user.

Referring to FIG. 7E, the content to which the emotional effect corresponding to the emotional level is applied may be stored in the memory 440. The electronic apparatus 710 may store, in the memory 440, an identifier of the content 712 displayed on the display 420, the emotional level of the user, and coordinate information on coordinates (position) at which the emotional effect is displayed. When the emotional effect is applied to the displayed content, the electronic apparatus 710 may store an identifier of the displayed content, a name thereof, whether the emotional effect is applied to the displayed content, the emotional level, and coordinate information of a point where the emotional effect is displayed. Then, when the stored content is accessed, the electronic apparatus 710 may display the emotional effect together with the content on the display 420. In this case, the displayed emotional effect may be displayed in response to the emotional level.

Figure 8:
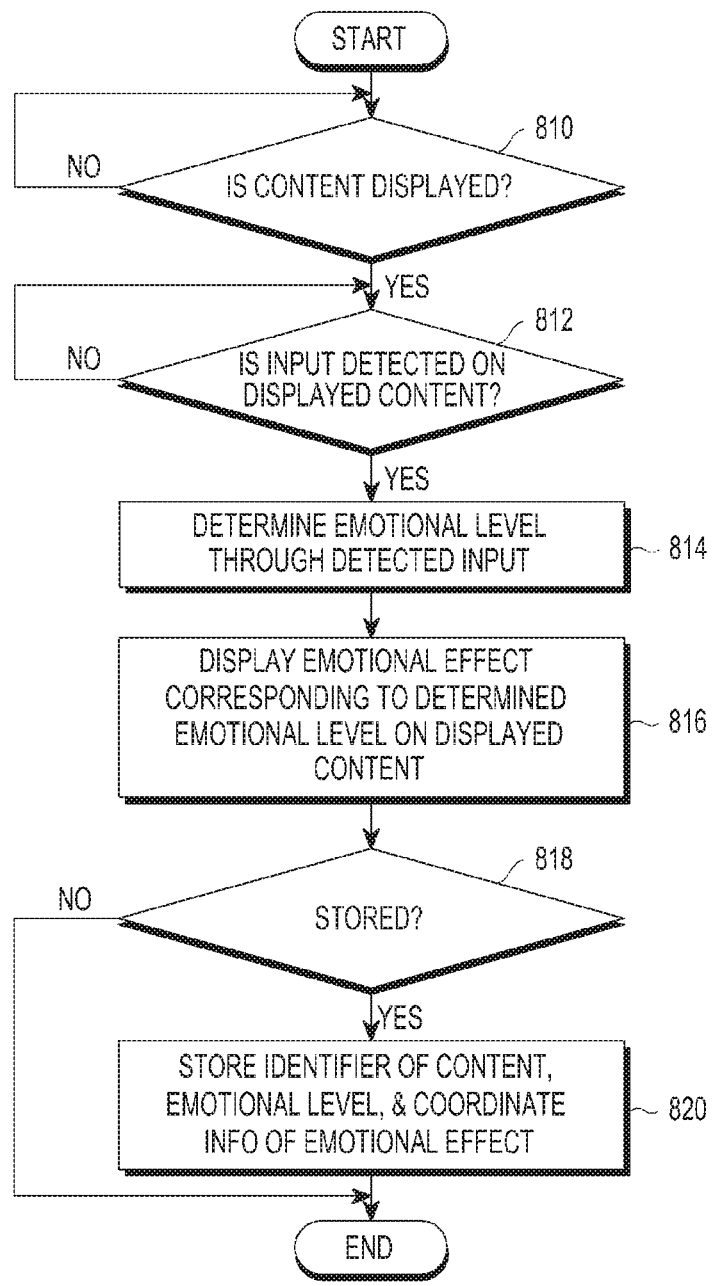
FIG. 8 is a flowchart illustrating a process for displaying an emotional effect corresponding to a touch on displayed content according to various embodiments of the present disclosure.

FIG. 8 is a flowchart illustrating a process for displaying an emotional effect corresponding to a touch on displayed content according to various embodiments of the present disclosure.

When an input by a touch or a hovering is generated in step 812 in a state of displaying the content in step 810, in step 814, the electronic apparatus 101 determines an emotional level based on the detected input by at least one of the touch and the hovering.

The display 420 may display various pieces of content (e.g., text, images, videos, icons, symbols, etc.). The electronic apparatus 101 may detect an input by a touch or a hovering from the user in a state of displaying the content. The electronic apparatus 101 may determine the number of times of the input or the strength of the input. When the content has been displayed on the display 420, the electronic apparatus 101 may track a point on the display 420 where the input by the user has been detected, and may determine a part of the displayed content at which the user has made the input. The electronic apparatus 101 may determine a current emotional degree of the user through the recognized input by the user. The electronic apparatus 101 may determine a state of an emotion of the user, through the number of times of the input or the strength of the input which is recognized. The electronic apparatus 101 may determine a state of a current emotion of the user, through a threshold according to an emotion which is pre-stored in the memory 440. For example, when the number of times of the input exceeds a predetermined threshold, the electronic apparatus 101 may determine that a current emotional level of the user is high.

The electronic apparatus 101 may determine an emotional level based on the detected input by at least one of the touch and the hovering, in step 814. The electronic apparatus 101 may detect an input from the user in a state of displaying the content. The input may include an input by a touch or a hovering performed by the user who is viewing the content. The electronic apparatus 101 may determine an emotion and an emotional level of the user through the number of times of the input or the strength of the input. Also, the electronic apparatus 101 may determine the degree of the input. The electronic apparatus 101 may determine that the emotional level of the user becomes higher as the degree of the input becomes higher. For example, when the content displayed on the display 420 is a photograph of a beautiful baby, the user may make an input by a touch or a hovering at an optional point on the display 420 so as to express a satisfied emotion while the user views the displayed content. In this case, the electronic apparatus 101 may recognize the input and may determine that the user is feeling pleasure. The electronic apparatus 101 may determine whether the emotional level of the user is high or low, according to the degree of the input. The electronic apparatus 101 may analyze the number of times of a touch, the strength of the touch, or the strength of a hovering from the user who is viewing the content and may determine whether the user is currently laughing or weeping, and may determine the emotional level of the user through such a determination basis.

In step 816, the electronic apparatus 101 displays an emotional effect, which corresponds to the determined emotional level, on the displayed content. The electronic apparatus 101 may display the emotional effect, which corresponds to the emotional level of the user, on the displayed content, and examples of the emotional effect may include various emoticons, icons, and characters, such as a heart symbol, a lightning symbol, and the like. Also, the emotional effect according to an embodiment of the present disclosure may not only include the above-described emoticons, icons, and characters, such as a heart symbol, a lightning symbol, and the like, but may also include various pieces of information capable of expressing an emotion of the user. The electronic apparatus 101 may analyze the input recognized in step 812 and may display the emotional effect at a point where the input has been detected. The emotional effect may move on the display 420 according to a command (e.g., a touch and drag, gaze of eyes, etc.) of the user. The electronic apparatus 101 may adjust the size of the emotional effect according to the emotional level of the user, and may display the emotional effect, which has the adjusted size, on the content. The electronic apparatus 101 may adjust the size, color, shape, and the like, of the emotional effect, according to the emotional level of the user, and may display the emotional effect, which has the adjusted size, color, shape, and the like, on the content.

When an input for storing the displayed content is received in step 818, in step 820, the electronic apparatus 101 stores an identifier of the content, the emotional level, and coordinate information of the emotional effect. Then, the electronic apparatus 101 may store the content to which the emotional effect is applied. The electronic apparatus 101 may store an identifier of the displayed content, the emotional level of the user, and coordinate information on coordinates (position) on the display 420 at which the emotional effect is displayed. Then, when the stored content is accessed, the electronic apparatus 101 may display the emotional effect together with the content on the display 420. In this case, the displayed emotional effect may be displayed in response to the emotional level.

Figure 9A:
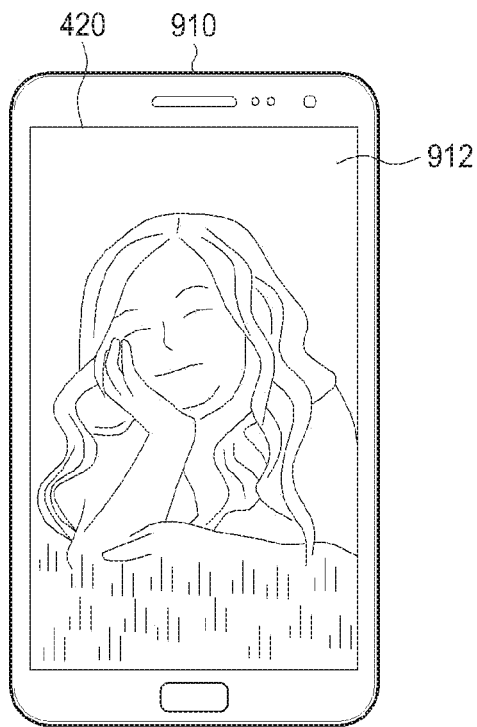
FIG. 9A is a view illustrating an example of displaying content according to various embodiments of the present disclosure.
Figure 9B:
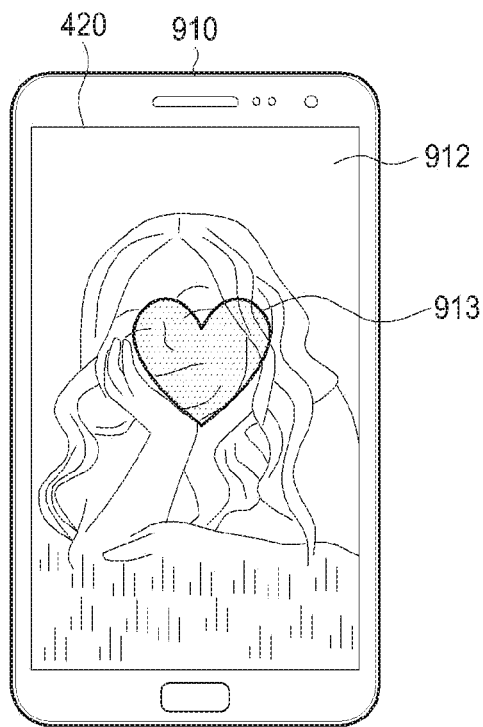
FIG. 9B is a view illustrating an example of displaying an emotional effect together with content in response to a touch in a state of displaying the content according to various embodiments of the present disclosure.
Figure 9C:
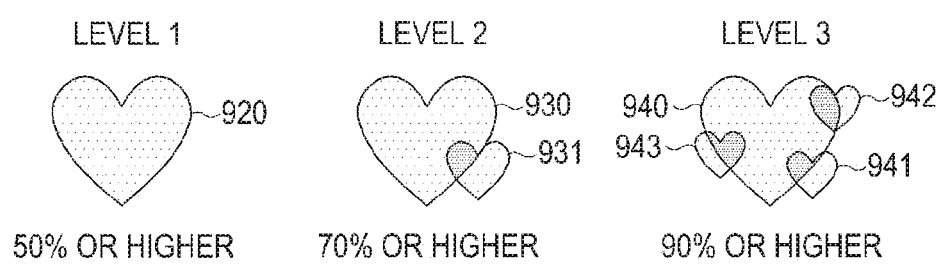
FIG. 9C is a view illustrating an example of displaying an emotional level of a user in response to a touch according to various embodiments of the present disclosure.
Figure 9D:
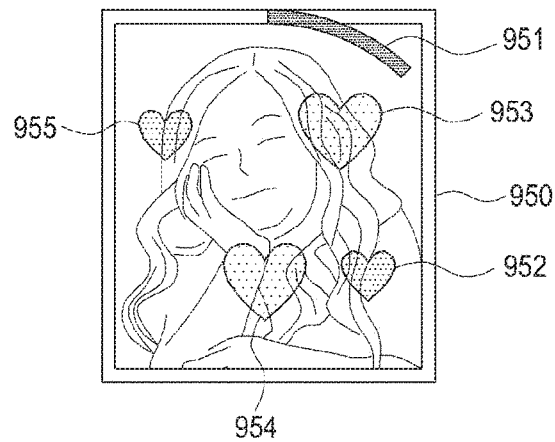
FIG. 9D is a view illustrating an example of applying an emotional level to content according to various embodiments of the present disclosure.
Figure 9E:
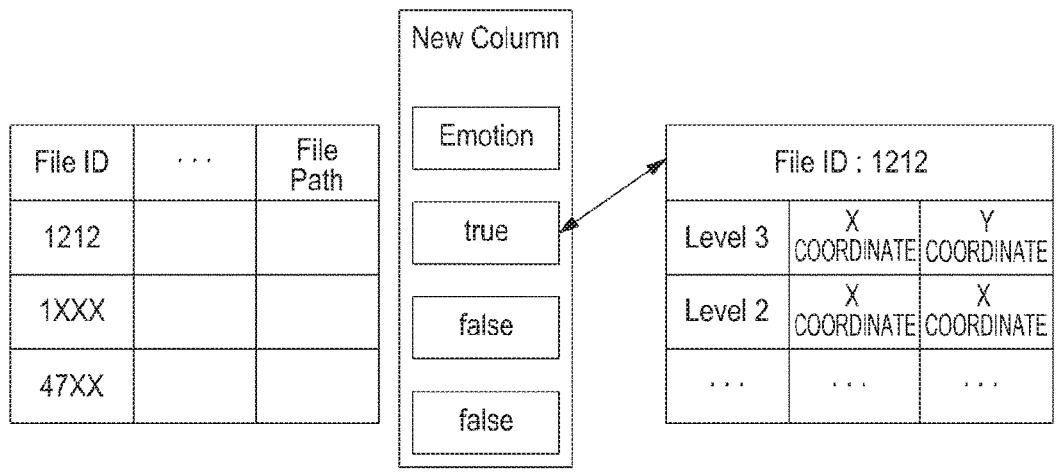
FIG. 9E is a view illustrating an example of storing content to which an emotional level is applied according to various embodiments of the present disclosure.

FIG. 9A is a view illustrating an example of displaying content according to various embodiments of the present disclosure. FIG. 9B is a view illustrating an example of displaying an emotional effect together with content in response to a touch in a state of displaying the content. FIG. 9C is a view illustrating an example of displaying an emotional level of a user in response to a touch. FIG. 9D is a view illustrating an example of applying an emotional level to content. FIG. 9E is a view illustrating an example of storing content to which an emotional level is.

Referring to FIGS. 9A and 9B, an electronic apparatus 910 may display the content 912 on the display 420. The electronic apparatus 910 may display content, such as a photograph, a picture, a moving image, on the display 420. The electronic apparatus 910 may detect an input by a touch or a hovering from the user in a state of displaying the content 912. When the user views the displayed content 912, the user may, for example, express an emotion of the user through the input using the touch or hovering. For example, the user may express that an emotional level of the user becomes higher as the number of times of a touch increases. The electronic apparatus 910 may determine a state of the emotion of the user, through the input by the user. As described above, the electronic apparatus 910 may determine the current emotion of the user through the recognized input by the user, and may determine an emotional degree of the user through the input by the user. When the emotional degree of the user has been determined, the electronic apparatus 910 may display an emotional effect 913 on the displayed content 912. For example, when the content 912 is a photograph of a beautiful baby and the user performs an input by a touch or a hovering while viewing the photograph of the beautiful baby, the electronic apparatus 910 may determine the emotion of the user and may display the emotional effect (e.g., heart) 913 on the displayed content 912. The emotional effect 913 may be displayed at an optional position on the display 420, or may be displayed at a point where the input by the user is detected. Also, the emotional effect 913 may have a position adjusted according to a touch and drag of the user. Further, the emotional effect 913 may have a size and a color adjusted according to the user. Further, the heart 913 is only an example of the emotional effect, and embodiments of the present disclosure may display various emotional effects capable of expressing an emotional state of the user. The emotional effect may have a color, a size, a shape, and the like, adjusted according to an emotional level of the user.

Referring to FIG. 9C, an emotional effect according to an embodiment of the present disclosure may be displayed according to an emotional level of the user. The electronic apparatus 910 may display an emotional effect, which corresponds to the emotional level of the user, on the displayed content, and examples of the emotional effect may include various emoticons, icons, and characters, such as a heart symbol, a lightning symbol, and the like. The emotional effects may be displayed according to the emotional level. For example, when the number of times of an input by the user is equal to 1, the electronic apparatus 910 may display an emotional effect corresponding to level 1. When the number of times of the input by the user is equal to 2, the electronic apparatus 910 may display an emotional effect corresponding to level 2. When the number of times of the input by the user is equal to 3, the electronic apparatus 910 may display an emotional effect corresponding to level 3. The number of times of the input by the user according to each level may be adjusted. As a result of recognizing the input by the user, for example, level 1, which is a case where the number of times of the input by the user is equal to 1 or the input is made for 3 seconds, is a case where an emotional degree of the user is low, and a relatively large heart 920 may be displayed. Also, for example, level 2, which is a case where the number of times of the input by the user is equal to 2 or the input is made for 5 seconds, is a case where the emotional degree of the user is normal, and a relatively large heart 930 and a relatively small heart 931 may be displayed. Further, for example, level 3, which is a case where the number of times of the input by the user is equal to 3 or the input is made for 7 seconds, is a case where the emotional degree of the user is high, and a relatively large heart 940 and multiple relatively small hearts 941, 942, and 943 may be displayed.

Referring to FIG. 9D, emotional effects 951, 952, 953, 954, and 955 corresponding to an emotional level according to an embodiment of the present disclosure may be applied to content 950 and may be displayed together with the content 950. For example, when the content 950 is a photograph of a beautiful baby and the user inputs a touch or a hovering on the photograph while viewing the photograph of the beautiful baby, the electronic apparatus 910 may determine the input by the user, and may display an emotional effect on the displayed content 950. The emotional effect may be expressed as multiple hearts 952, 953, 954, and 955, or may be expressed as a bar shape 951 displayed around the content according to the emotional level. The hearts 952, 953, 954, and 955 or the bar shape 951 may have a size or the degree of increase in length depending on the emotional level. The emotional effects 951, 952, 953, 954, and 955 may each have a color, a size, a shape, and the like, adjusted according to the emotional level or emotional degree of the user. Also, the heart may be displayed at a point where the touch or hovering by the user is detected.

Referring to FIG. 9E, the content to which the emotional effect corresponding to the emotional level is applied according to an embodiment of the present disclosure, may be stored in the memory 440. The electronic apparatus 910 may store, in the memory 440, an identifier of the content 912 displayed on the display 420, the emotional level of the user, and coordinate information on coordinates (position) at which the emotional effect is displayed. When the emotional effect is applied to the displayed content, the electronic apparatus 910 may store an identifier of the displayed content, whether the emotional effect is applied to the displayed content, the emotional level, and coordinate information of a point where the emotional effect is displayed. Then, when the stored content is accessed, the electronic apparatus 910 may display the emotional effect together with the content on the display 420. In this case, the displayed emotional effect may be displayed in response to the emotional level.

The term "module" as used herein may, for example, mean a unit including one of hardware, software, and firmware or a combination of two or more of them. The term "module" may be interchangeably used with, for example, the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) may be implemented by a command stored in a non-transitory computer-readable storage medium in a programming module form. The instruction, when executed by a processor (e.g., the processor 120), may cause the one or more processors to execute the function corresponding to the instruction. The non-transitory computer-readable storage medium may be, for example, the memory 130.

The non-transitory computer readable storage medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high level language codes, which can be executed in a computer by using an interpreter, as well as machine codes made by a compiler. The aforementioned hardware device may be configured to operate as one or more software modules in order to perform the operations according to an embodiment of the present disclosure, and vice versa.

According to various embodiments of the present disclosure, in a storage medium that stores instructions, the instructions may be configured to cause at least one processor to perform at least one operation when executed by the at least one processor, and the at least one operation may include displaying content, detecting an input corresponding to the displayed content, determining an emotional level based on the detected input, and applying an emotional effect corresponding to the determined emotional level to the displayed content, and displaying the emotional effect, which is applied to the displayed content, on the displayed content.

The programming module according to an embodiment of the present disclosure may include one or more of the aforementioned components or may further include additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

Various embodiments disclosed herein are provided to describe technical details of the present disclosure and to help the understanding of the present disclosure, and do not limit the scope of the present disclosure. Accordingly, the scope of the present disclosure should be construed as including all modifications or various other embodiments based on the technical idea of the present disclosure as defined by the appended claims and their equivalents.

What is claimed is:

1. A method for controlling a display by an electronic apparatus, the method comprising:
   displaying content;
   detecting an input corresponding to the displayed content;
   determining a type of emotion based on the detected input;
   determining an emotional level corresponding to the type of the emotion based on the detected input;
   applying an emotional effect corresponding to the determined emotional level and the type of the emotion to the displayed content; and
   displaying the emotional effect on the displayed content.

2. The method of claim 1, wherein the detected input comprises at least one of recognition of a face of a user who views the displayed content, a touch on the displayed content, and a hovering on the displayed content.

3. The method of claim 1, further comprising activating a camera that recognizes a face of a user in response to the display of the content.

4. The method of claim 2, wherein determining the emotional level comprises determining an emotion of the user through a facial expression of the recognized face of the user.

5. The method of claim 2, wherein determining the emotional level comprises determining an emotion of the user through at least one of a duration of the touch and the number of times of the touch.

6. The method of claim 4, wherein determining the emotional level further comprises determining that the emotional level becomes higher as a degree of the facial expression of the recognized face of the user becomes higher.

7. The method of claim 5, wherein determining the emotional level further comprises determining that the emotional level is high, if the duration of the touch is greater than or equal to a threshold, or the number of times of the touch is greater than or equal to a threshold.

8. The method of claim 1, wherein displaying the emotional effect comprises displaying the emotional effect at a touched point if the detected input corresponds to a touch.

9. The method of claim 1, further comprising storing the content to which the emotional effect is applied.

10. The method of claim 9, wherein storing the content comprises storing at least one of an identifier of the displayed content, the emotional level, and coordinate information at which the emotional effect is displayed.

11. An electronic apparatus for controlling a display, the electronic apparatus comprising:
    a display that displays content; and
    a control unit that detects an input corresponding to the displayed content, determines a type of emotion based on the detected input, determines an emotional level corresponding to the type of the emotion based on the detected input, and applies an emotional effect corresponding to the determined emotional level and the type of the emotion to the displayed content, wherein the display displays the applied emotional effect.

12. The electronic apparatus of claim 11, wherein the detected'input comprises at least one of recognition of a face of a user who views the displayed content, a hovering on the displayed content, and a touch on the displayed content.

13. The electronic apparatus of claim 11, further comprising a camera configured to recognize a face of a user in response to the display of the content.

14. The electronic apparatus of claim 12, wherein the control unit determines an emotion of the user through a facial expression of the recognized face of the user.

15. The electronic apparatus of claim 12, wherein the control unit determines an emotion of the user through at least one of a duration of the touch and the number of times of the touch.

16. The electronic apparatus of claim 14, wherein the control unit determines that the emotional level becomes higher as a degree of the facial expression of the recognized face of the user becomes higher.

17. The electronic apparatus of claim 15, wherein the control unit determines that the emotional level is high if the duration of the touch is greater than or equal to a threshold or the number of times of the touch is greater than or equal to a threshold.

18. The electronic apparatus of claim 11, wherein the display displays the emotional effect at a touched point if the detected input corresponds to a touch.

19. The electronic apparatus as claimed in claim 11, further comprising a memory that stores the content to which the emotional effect is applied.

20. The electronic apparatus of claim 19, wherein the control unit stores at least one of an identifier of the displayed content, the emotional level, and coordinate information at which the emotional effect is displayed.

* * * * *